United States Patent [19]
Hays

[11] 3,950,881
[45] Apr. 20, 1976

[54] FISH LINE SPOOL HOLDER FOR TRANSFERRING FISHING LINE TO REEL

[76] Inventor: Leonard K. Hays, P.O. Box 8113, Fort Worth, Tex. 76112

[22] Filed: Feb. 10, 1975

[21] Appl. No.: 548,545

[52] U.S. Cl. .............................. 43/25; 242/129.51
[51] Int. Cl.² ........................................ A01K 89/00
[58] Field of Search .................. 43/25, 25.2, 20, 18; 242/106, 136, 129.51

[56] References Cited
UNITED STATES PATENTS

| | | | |
|---|---|---|---|
| 637,093 | 11/1899 | Denekas | 242/129.51 |
| 2,578,045 | 12/1951 | Conrad et al. | 43/20 |
| 2,993,661 | 7/1961 | D'Arrigo | 43/20 |
| 3,113,363 | 12/1963 | Fyvie | 43/25 |
| 3,399,847 | 9/1968 | Slate | 43/25.2 |
| 3,776,485 | 12/1973 | Foley et al. | 43/25 |
| 3,799,471 | 3/1974 | Morris et al. | 242/129.51 |

Primary Examiner—Warner H. Camp
Attorney, Agent, or Firm—Wofford, Felsman, Fails & Zobal

[57] ABSTRACT

The specification discloses a universal spool holding device to be attached to a fishing rod for use in winding a fishing line from the spool to the reel of the fishing rod. The device has a first pair of spaced resilient spool holding arms extending in a first direction from a base portion and a second pair of spaced resilient rod gripping arms extending from the base portion in an opposite direction. The inside portion of the free ends of the spool holding arms have inward extending curved shoulders facing each other with cone shaped members extending from the shoulders towards each other for insertion into the axial bore of a spool for supporting the spool for rotation. The spaced rod gripping arms define apertures of different sizes for attaching the device to a fishing rod.

5 Claims, 7 Drawing Figures

FISH LINE SPOOL HOLDER FOR TRANSFERRING FISHING LINE TO REEL

SUMMARY OF THE INVENTION

It is an object of the present invention to provide a simple, economic, effective and universal spool holding device to be attached to a fishing rod for use in winding a fishing line from the spool to the reel of the rod. The spool holding device of the present invention may be readily attached to rods of different sizes; is capable of holding different size spools; and provides a desired amount of drag when the line is being unwound from the spool.

The spool holding device of the present invention comprises a first pair of spaced resilient spool holding arms extending in a first direction from a base portion in a given plane. A second pair of spaced resilient rod gripping arms extend from the base portion in said given plane in a direction opposite said first direction. Said arms of said first and second pair are symmetrical about a midplane perpendicular to said given plane and which extends between the arms of said first pair and between the arms of said second pair. The inside portions of the free ends of the spool holding arms have shoulders of a given length which face each other and curve toward said midplane between the inner and outer ends of said shoulders, as seen in said given plane. Spool support members extend from the shoulders toward each other and have their free ends tapered toward said midplane for insertion into the axial bore of a spool for supporting the spool for rotation. Each of the spool support members has its base, at the junction thereof with its associated shoulder, spaced inward from said inner and outer ends of its shoulder. In the normal relaxed position of the spool holding arms, the distance between the spool holding arms gradually decreases at increased distances from a given position near said base portion to the inner ends of said curved shoulders. The curved shoulders are closer to the midplane than the portion of the spool holding arms between the inner ends of said shoulders in said given position. In the normal relaxed position of said spool holding arms, the shoulders slant toward the midplane from their inner ends toward their outer ends with their outer ends being closer to said midplane than their inner ends.

In a further embodiment, the shoulders of said spool holding device, as seen in a cross sectional plane perpendicular to said given plane and to said midplane, curve from their sides towards said midplane.

In a further aspect, the space between said gripping arms defines at least two different circular apertures of different diameters and whose centers are spaced apart and coincide with said midplane. The smaller aperture is located closer to said base portion than the larger aperture.

DETAILED DESCRIPTION OF THE PRESENT INVENTION

Figure 1:
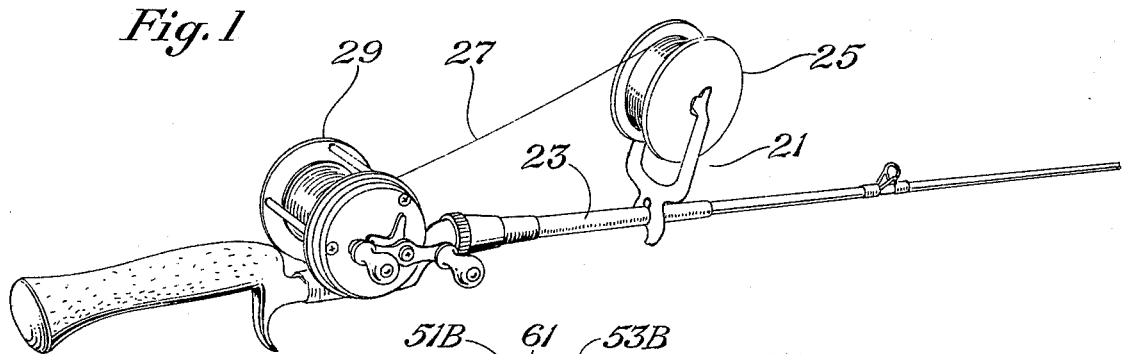
FIG. 1 is a perspective view of the spool holding device of the present invention attached to a fishing rod.

Referring to FIG. 1, the device of the present invention is identified at 21 and is illustrated as attached to the rod 23 of a fishing rod and holding a spool 25 to facilitate reeling the fish line 27 from the spool 25 onto the reel 29 of the fishing rod.

Figure 3:
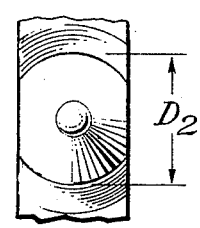
FIG. 3 is a view of a portion of FIG. 2 taken along the lines 3—3 thereof.
Figure 2:
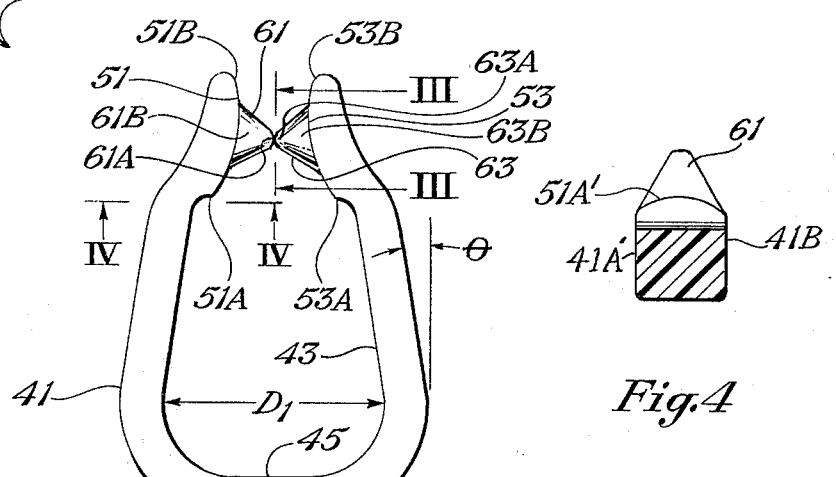
FIG. 2 is a side view of the device of FIG. 1 with its spool holding arms in a relaxed position.
Figure 4:
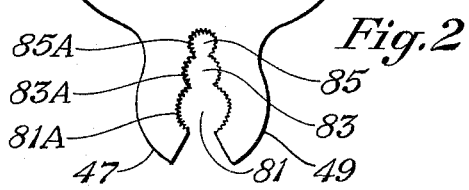
FIG. 4 is a cross sectional view of the device of FIG. 2 taken along the lines 4—4 thereof.
Figure 5:
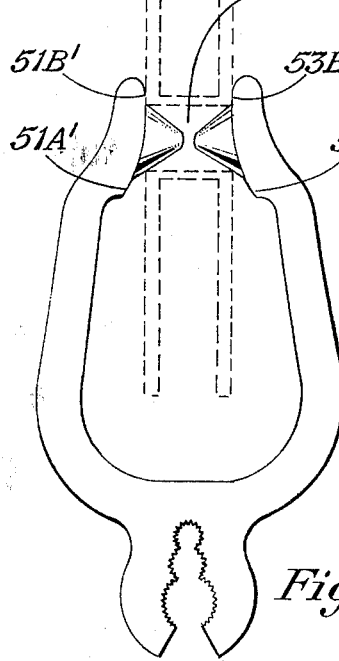
FIGS. 5, 6, and 7 illustrate the spool holding device of the present invention rotatably supporting spools having axial bores of different lengths.

Referring to FIGS. 2–4, the spool holding device 21 is a one-piece member which may be molded from vinyl, teflon, or nylon. It has a first pair of spaced resilient spool holding arms 41 and 43 extending from a base portion 45 in a first direction in the thin plane of the device and a second pair of spaced resilient rod gripping arms 47 and 49 extending from the base portion 45 in the thin plane in a direction opposite the first direction. The arms 41 and 43 and the arms 47 and 49 are symmetrical about a midplane coinciding with lines 3—3 which is perpendicular to the thin plane and which extends between the arms 41 and 43 and between the arms 47 and 49. The inside portions of the free ends of the spool holding arms 41 and 43 have shoulders 51 and 53 of a given length which face each other and which curve toward the midplane between the inner and outer ends of the shoulders, as seen in FIG. 2. The inner and outer ends of shoulder 51 are identified at 51A and 51B while the inner and outer ends of shoulder 53 are identified at 53A and 53B. Referring to FIG. 5, the inner portions of shoulders 51 and 53 are identified at 51A' and 53A' while the outer portions of shoulders 51 and 53 are identified at 51B' and 53B'. Spool support members 61 and 63 extend from the shoulders 51 and 53 toward each other and have their free ends tapered toward the midplane for insertion into the axial bore of a spool for supporting the spool for rotation. In the embodiment disclosed, the members 61 and 63 are cone shaped and in the relaxed position of the arms 41 and 43, their pointed ends 61A and 61B are in contact or nearly in contact with each other. The base portions 61B and 63B of the members 61 and 63 at the junction thereof, with the shoulders 51 and 53, are spaced inward from the inner and outer ends of the shoulders, as illustrated. In the normal relaxed position of the spool holding arms 41 and 43, the greatest distance between the arms 41 and 43 is defined by $D_1$ which is located near the base portion 45. From $D_1$ to the inner ends 51A and 53A of shoulders 51 and 53, the distance between the arms 41 and 43 gradually decreases. The curved shoulders 51 and 53 are closer to the midplane than the portion of the arms 41 and 43 between the inner ends 51A and 53A and $D_1$. Moreover, in the normal relaxed position of the spool holding arms 41 and 43, the outer ends 51B and 53B of the curved shoulders 51 and 53 are closer to the midplane than the inner ends 51A and 53A. As seen in a cross sectional plane perpendicular to the thin plane and to the midplane, the inner and outer portions of shoulders 51 and 53 curve from the sides of arms 41 and 43 toward the midplane. This is illustrated by FIG. 4 which is taken through lines 4—4 of FIG. 2. As seen in FIG. 4, the inner portion 51A' of shoulder 51 curves inward toward the midplane from the sides 41A and 41B of arm 41. The outer portion 51B' of shoulder 51 curves in a similar manner, as well as the inner and outer portions 53A' and 53B' of shoulder 53.

Figures 6, 7:
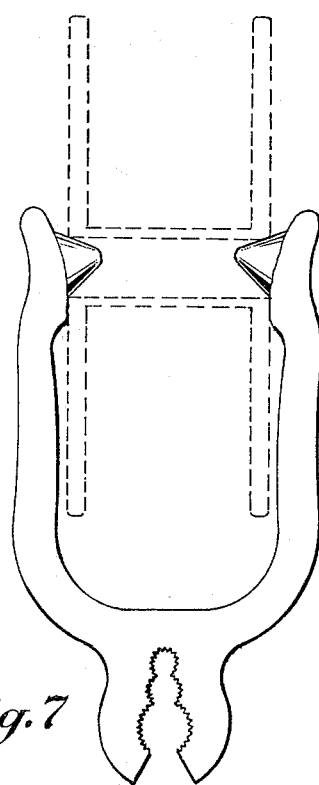

In use, the arms 41 and 43 will be expanded to allow the cones 61 and 63 to be inserted into the axial bore of a spool for supporting the spool for rotation. Since the shoulders 51 and 53 extend or project inward from arms 41 and 43 toward the midplane, the arms 41 and 43 can be expanded outward to hold spools having axial bores of different lengths without contact between the rims of the spools and the portion of the arms 41 and 43 between the inner ends 51A and 53A of the shoulders and the base portion 45. This is illustrated in FIGS. 5–7 wherein spools 73 having axial bores 71 of three different lengths are supported for rotation by arms 41 and 43. The curved shoulders 51 and 53 prevent the spools from snagging during rotation which may otherwise occur since many spools have outward projecting letters formed around their bores. For a spool having a short axial bore, the spool rides on the cones 61 and 63 and is stabilized by the outer shoulder portions 51B' and 53B' to provide tension or drag on the spool to prevent the line from accidentally unwinding from the spool and to allow the line to be tightly wound on the reel 29 of the fishing rod. This is illustrated in FIG. 5. For a spool having a relatively long axial bore, the spool rides on the cones 61 and 63 and is stabilized by the inner shoulder portions 51A' and 53A', as illustrated in FIG. 7. For a spool having an axial bore of a medium length, the spool rides on cones 61 and 63 and is also stabilized by these cones, as illustrated in FIG. 6.

Since the inner and outer shoulder portions 51A', 53A' and 51B', 53B' of shoulders 51 and 53 extend beyond the cones 61 and 63, the spool holding device may be employed to rotatably support spools having bores with inside diameters greater than those shown in FIGS. 5–7. In supporting such spools having bores of larger diameter, the cones 61 and 63 will fit into the axial bores while the inner and outer shoulder portions 51A', 53A' and 51B', 53B' of shoulders 51 and 53 will provide tension and stabilize the spools to provide the desired amount of drag to facilitate winding.

As illustrated in FIG. 2, the spaced apart rod gripping arms 47 and 49 define three different circular apertures 81, 83 and 85 of different diameters and whose centers are spaced apart and coincide with the midplane. The apertures 81, 83 and 85 are accessible through the space formed between the arms 47 and 49. The largest aperture 81 is located closest to the free ends of arms 47 and 49; the smallest aperture 85 is located closest to the base portion 45; and the medium size aperture 83 is located between apertures 81 and 85. With this arrangement, the spool holding device may be readily attached to many different size rods by merely snapping the arms 47 and 49 in place around the rod with the rod fitted in either apertures 81, 83 or 85, depending upon the size of the rod and the position in which the spool holding device is snapped in place to the rod. The snap-on feature is particularly important in attaching the device to the newer type bass rods which are continuous piece rods having no joints. As shown, grooves 81A, 83A and 85A are formed in the circular walls of the arms 47 and 49 defining the apertures 81, 83 and 85 to provide a better gripping surface. Since the smaller holes 83 and 85 have less wall surface, however, it may be desirable not to form grooves in the walls of holes 83 and 85.

In one embodiment, the distance $D_1$ is equal to 1.5 inches, while the distance between the points of cones 61 and 63 and the base portion 45 is equal to 1.75 inches. Shoulders 51 and 53 have a length equal to about three-fourths of an inch. The radius of curvature of the shoulders 51 and 53 as seen in FIG. 2 is five-eighths of an inch. As illustrated in the relaxed position of arms 41 and 43, the shoulders 51 and 53 generally slant toward the midplane from their inner ends toward their outer ends, with their outer ends 51B and 53B being closer to the midplane than their inner ends 51A and 53A. With this structure, the outer shoulder portions 51B' and 53B' will engage a reel having a short axial bore, as illustrated in FIG. 5, while the inner shoulder portions 51A' and 53A' will engage a spool having a longer axial bore, as illustrated in FIG. 7. The angle $\theta$ is equal to 9°. The arms 41 and 43 between the inner ends 51A and 53A of the shoulders 51 and 53 and the base portion 45 are square in cross section, having sides of one-fourth of an inch. The device 21 has a thickness of one-fourth of an inch and hence is relatively thin. The base of each cone has a dimension $D_2$ of about one-half of an inch. The diameters of apertures 81, 83 and 85 are three-eighths of an inch, one-fourth of a inch, and three-sixteenths of an inch respectively, which allow the spool holder to fit all of the popular rods now on the market.

Although the spool holder of the present invention was described in one embodiment as having certain dimensions, it is to be understood that it may be constructed with other dimensions.

I claim:
1. A spool holding device for use in winding a fish line from a spool to the reel of a fishing rod comprising:
   a first pair of spaced resilient spool holding arms extending in a first direction from a base portion in a given plane,
   a second pair of spaced resilient rod gripping arms extending from said base portion in said given plane in a direction opposite said first direction,
   said arms of said first and second pair being symmetrical about a midplane perpendicular to said given plane and which extends between the arms of said first pair and between the arms of said second pair,
   the inside portions of the free ends of said spool holding arms having shoulders of a given length which face each other and curve toward said midplane between the inner and outer ends of said shoulders as seen in said given plane,
   spool support members extending from said shoulders toward each other and having their free ends tapered towards said midplane for insertion into the axial bore of a spool for supporting the spool for rotation,
   each of said spool support members having its base at the junction thereof with its associated shoulder, spaced inward from said inner and outer ends of its associated shoulder as seen in said given plane,
   in the normal relaxed position of said spool holding arms, the distance between said spool holding arms gradually decreasing at increased distances from a given position near said base portion to the inner ends of said curved shoulders,
   said curved shoulders being closer to said midplane than the portion of said arms between the inner ends of said shoulders and said given position,
   in the normal relaxed position of said spool holding arms, said shoulders generally slanting toward said midplane from their inner ends toward their outer ends with their outer ends being closer to said midplane than their inner ends.

2. The spool holding device of claim 1 wherein said shoulders, as seen in a cross sectional plane perpendicular to said given plane and to said midplane, curve from their sides toward said midplane.

3. The spool holding device of claim 1 wherein:
the space between said gripping arms define at least two different circular apertures of different diameters and whose centers are spaced apart and coincide with said midplane,
the smaller aperture being located closer to said base portion than the larger aperture.

4. The spool holding device of claim 2 wherein:
the space between said gripping arms define at least two different circular apertures of different diameters and whose centers are spaced apart and coincide with said midplane,
the smaller aperture being located closer to said base portion than the larger aperture.

5. The spool holding device of claim 4 wherein said spool support members comprise cone shaped members.

* * * * *